US009857857B2

(12) United States Patent
Lin et al.

(10) Patent No.: US 9,857,857 B2
(45) Date of Patent: Jan. 2, 2018

(54) HUB CONTROL METHOD AND ASSOCIATED CIRCUIT

(71) Applicant: Realtek Semiconductor Corp., HsinChu (TW)

(72) Inventors: Neng-Hsien Lin, Hsinchu County (TW); Luobin Wang, Jiangsu (CN)

(73) Assignee: Realtek Semiconductor Corp., HsinChu (TW)

( * ) Notice: Subject to any disclaimer, the term of this patent is extended or adjusted under 35 U.S.C. 154(b) by 283 days.

(21) Appl. No.: 14/702,781

(22) Filed: May 4, 2015

(65) Prior Publication Data

US 2015/0324313 A1 Nov. 12, 2015

(30) Foreign Application Priority Data

May 6, 2014 (CN) .......................... 2014 1 0189474

(51) Int. Cl.
*G06F 11/30* (2006.01)
*G06F 1/32* (2006.01)
*G06F 13/40* (2006.01)
*G06F 13/42* (2006.01)
*G06F 13/38* (2006.01)

(52) U.S. Cl.
CPC ............ *G06F 1/32* (2013.01); *G06F 11/3051* (2013.01); *G06F 11/3055* (2013.01); *G06F 13/385* (2013.01); *G06F 13/40* (2013.01); *G06F 13/4022* (2013.01); *G06F 13/4031* (2013.01); *G06F 13/4221* (2013.01); *G06F 13/4282* (2013.01); *Y02B 60/1228* (2013.01); *Y02B 60/1235* (2013.01)

(58) Field of Classification Search
CPC ........ G06F 1/266; G06F 1/325; G06F 1/3206; G06F 1/3237; G06F 1/3287; G06F 2213/4002; G06F 11/3051; G06F 11/3055; G06F 13/4022; G06F 13/385
See application file for complete search history.

(56) References Cited

U.S. PATENT DOCUMENTS

| 7,502,878 | B1 * | 3/2009 | Wright | ................ G06F 13/4022 710/37 |
| 2006/0230199 | A1 | 10/2006 | Yu | |
| 2009/0240873 | A1 * | 9/2009 | Yu | ......................... G06F 3/0608 711/103 |
| 2010/0315752 | A1 * | 12/2010 | Rabu | ..................... H01R 31/06 361/103 |
| 2010/0332931 | A1 * | 12/2010 | Stephens | ............ G01R 31/3171 714/738 |

(Continued)

FOREIGN PATENT DOCUMENTS

TW 200812293 3/2008

*Primary Examiner* — Ernest Unelus
(74) *Attorney, Agent, or Firm* — Winston Hsu

(57) ABSTRACT

A hub hub control method, wherein the hub possesses an uplink port and a plurality of downlink ports, includes: receiving link status of each downlink port to know whether each downlink port has built a link; and when none of the plurality of downlink ports has built a link, controlling the uplink port to be unable to build a link. A hub control circuit, the hub possessing an uplink port and a plurality of downlink ports, includes a link status reception unit and an uplink port control unit for respective execution of the two steps of the hub control method.

20 Claims, 4 Drawing Sheets

(56) References Cited

U.S. PATENT DOCUMENTS

| | | | | |
|---|---|---|---|---|
| 2012/0284449 A1* | 11/2012 | Tung | ........................ | G06F 3/023 |
| | | | | 710/316 |
| 2013/0054866 A1* | 2/2013 | Saito | ........................ | G06F 1/266 |
| | | | | 710/313 |
| 2013/0217274 A1* | 8/2013 | Bar-Niv | ................. | H01R 27/02 |
| | | | | 439/676 |

\* cited by examiner

HUB CONTROL METHOD AND ASSOCIATED CIRCUIT

BACKGROUND OF THE INVENTION

1. Field of the Invention

The disclosed embodiments of the present invention relate to hub control, and more particularly, to a hub control method characterized by controlling an uplink port according to link status of downlink ports, and an associated circuit.

2. Description of the Prior Art

A conventional hub, such as a Universal Serial Bus 3.0 (USB 3.0) hub, may possess an uplink port for communicating with a host terminal, and several downlink ports for connecting to devices. In this way, the host terminal may access the devices through the hub. According to the USB 3.0 hub standard, when none of the downlink ports is connected, the hub may be allowed to turn off most of the modules in order to save power, and the host terminal may control the hub to enter a power saving mode.

Even in the power saving mode, the uplink port of the hub still needs to be awake in case the host terminal tries to wake up the hub. In another case, when the downlink power establishes a connection, the hub may notify the host terminal by a remote wakeup command. Further, the conventional hub may require a specific driver installation to enable power management.

In light of the above, the power management for the hub needs improvement. As a result, there is an urgent need for a novel hub control method which can address the issues in the prior art.

SUMMARY OF THE INVENTION

One of the objectives of the present invention is to provide a hub control method characterized by controlling an uplink port according to link status of downlink ports, and an associated circuit, to alleviate power consumption of the hub.

According to a first aspect of the present invention, a hub control method is disclosed. The hub possesses an uplink port and a plurality of downlink ports. The hub control method comprises: receiving respective link status of each downlink port to learn whether each downlink port has established a connection; and when none of the plurality of downlink ports has established a connection, configuring the uplink port to be incapable of establishing a connection.

According to a second aspect of the present invention, a hub control circuit is disclosed. The hub possesses an uplink port and a plurality of downlink ports. The hub control circuit comprises a link status and an uplink port control unit. The link status receiving unit is arranged to receive respective link status of each downlink port to learn whether each downlink port has established a connection and generate a first control signal accordingly. The uplink port control unit is arranged to generate a second control signal according to the first control signal, wherein the second control signal is arranged to configure the uplink port to be incapable of establishing a connection.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
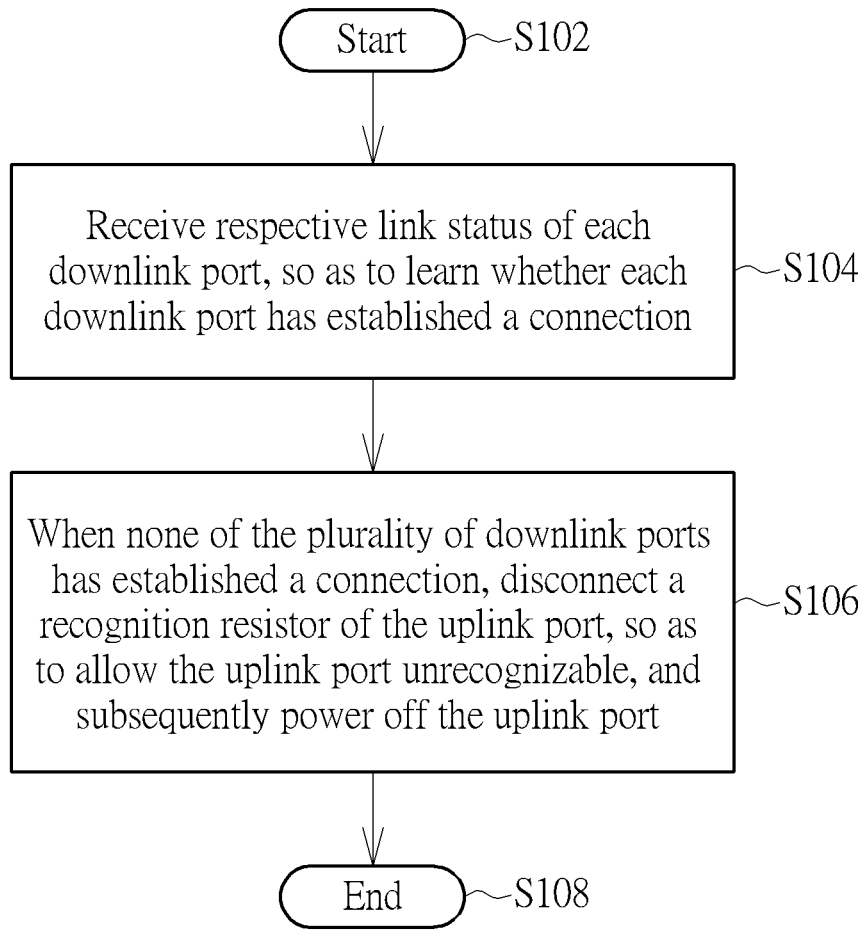
FIG. 1 is a flowchart illustrating a control method for controlling a hub according to an exemplary embodiment of the present invention.

The embodiment as follows is illustrated by a Universal Serial Bus 3.0 (USB 3.0) hub, but this is not a limitation of the invention. FIG. 1 is a flowchart illustrating a control method for controlling a hub according to an exemplary embodiment of the present invention. Provided that substantially the same result is achieved, the steps of the flowchart shown in FIG. 1 need not be in the exact order shown and need not be contiguous; that is, other steps can be intermediate. Some steps in FIG. 1 may be omitted according to various embodiments or requirements. The control method is briefly summarized as follows.

Step S102: Start;

Step S104: Receive respective link status of each downlink port to learn whether each downlink port has established a connection;

Step S106: When none of the plurality of downlink ports has established a connection, disconnect a recognition resistor of the uplink port to allow the uplink port to be unrecognizable, and subsequently power off the uplink port;

Step S102: End.

Figure 2:
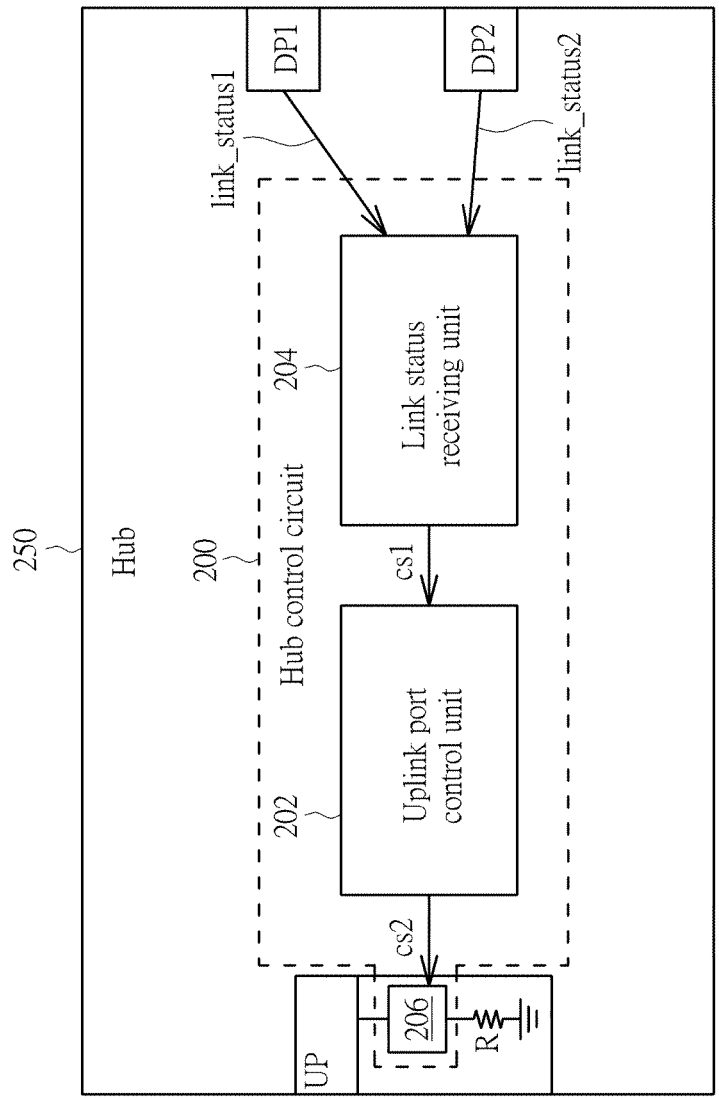
FIG. 2 is a diagram illustrating a hub according to an embodiment of the present invention.

For illustrative purposes, refer to FIG. 2 in conjunction with FIG. 1. FIG. 2 is a diagram illustrating a hub according to an embodiment of the present invention. The hub 250 possesses an uplink port UP and a first downlink port DP1 and a second downlink port DP2. A hub control circuit 200 includes a link status receiving unit 204 and an uplink port control unit 202, wherein the link status receiving unit 204 is arranged to receive a signal link_status1 generated by a physical layer of the first downlink port DP1, and a signal link_status2 generated by a physical layer of the second downlink port DP2. By referring to the two signals signal link_status1 and signal link_status2, the hub control circuit 200 may learn whether the first downlink port DP1 or the second downlink port DP2 has established a connection with another device. The uplink port control unit 202 may be operable to receive a first control signal cs1 produced by the link status receiving unit 204. When the uplink port control unit 202 learns that neither the first downlink port DP1 nor the second downlink port DP2 has established a connection, the uplink port control unit 202 will generate a second control signal cs2 for controlling a switch 206 to disconnect a recognition resistor R of the uplink port UP, which makes the uplink port UP unrecognizable. In this way, the host terminal cannot recognize the uplink port UP as a USB 3.0 compliant port, so no link will be established between the host terminal and the hub 250.

When the first control signal cs1 controls the uplink port control unit 202 to disconnect the recognition resistor R, the hub 250 will immediately lose its connection to the host terminal; this process is not harmful since the USB port inherently supports a hot-plug. In other words, the host terminal may regard this process as a cable being removed from the USB port, although no actual cable is removed from the host terminal or the hub 250. Then, the uplink port control unit 202 may be operable to actively power off the uplink port UP instead of waiting for a power saving mode command from the host terminal. As a result, the disclosed hub control method can be free from a specific system configuration or driver installation. Further, the uplink port UP does not need to consistently monitor a wake up command sent from the host terminal. Equivalently, the uplink port UP may be completely powered off. Note the invention is not limited to completely power off the uplink port UP. For instance, the uplink port UP may be partially powered off or remain powered.

When the signal link_status1 indicates the first downlink port DP1 has established a connection, or when the signal link_status2 indicates the second downlink port DP2 has established a connection, the link status receiving unit 204 may be operable to send the first control signal cs1 to notify the uplink port control unit 202 to switch the switch 206 from disconnected to connected. Then, the uplink port control unit 202 may be operable to power on the uplink port UP, so that the uplink port UP can be recognized by the host terminal and the connection between the uplink port UP and the host terminal can be established.

Figure 3:
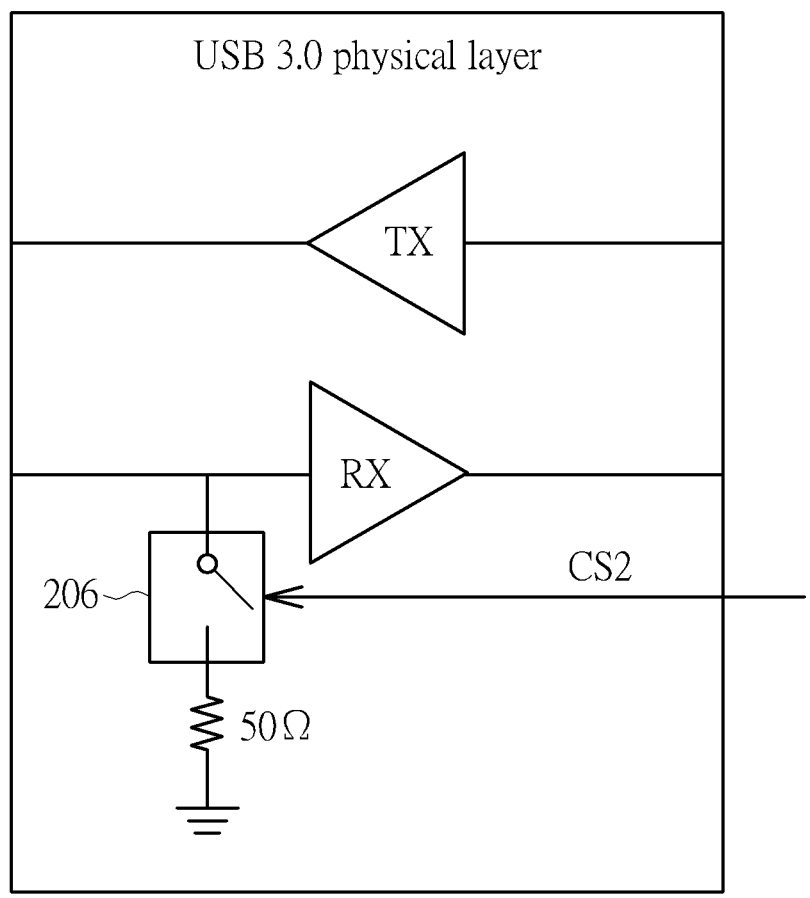
FIG. 3 is a diagram illustrating a switch configured in a USB 3.0 physical layer according to an embodiment of the present invention.

FIG. 3 is a diagram illustrating a switch configured in the USB 3.0 physical layer according to an embodiment of the present invention. The switch 206 is coupled between a receiving path and a 50 ohm recognition resistor. The other terminal of the 50 ohm recognition resistor is coupled to a ground voltage. The switch 206 may be controlled by the second control signal cs2 to connect or disconnect the 50 ohm recognition resistor accordingly. Note that the invention is not limited to the arrangement shown in FIG. 3.

Figure 4:
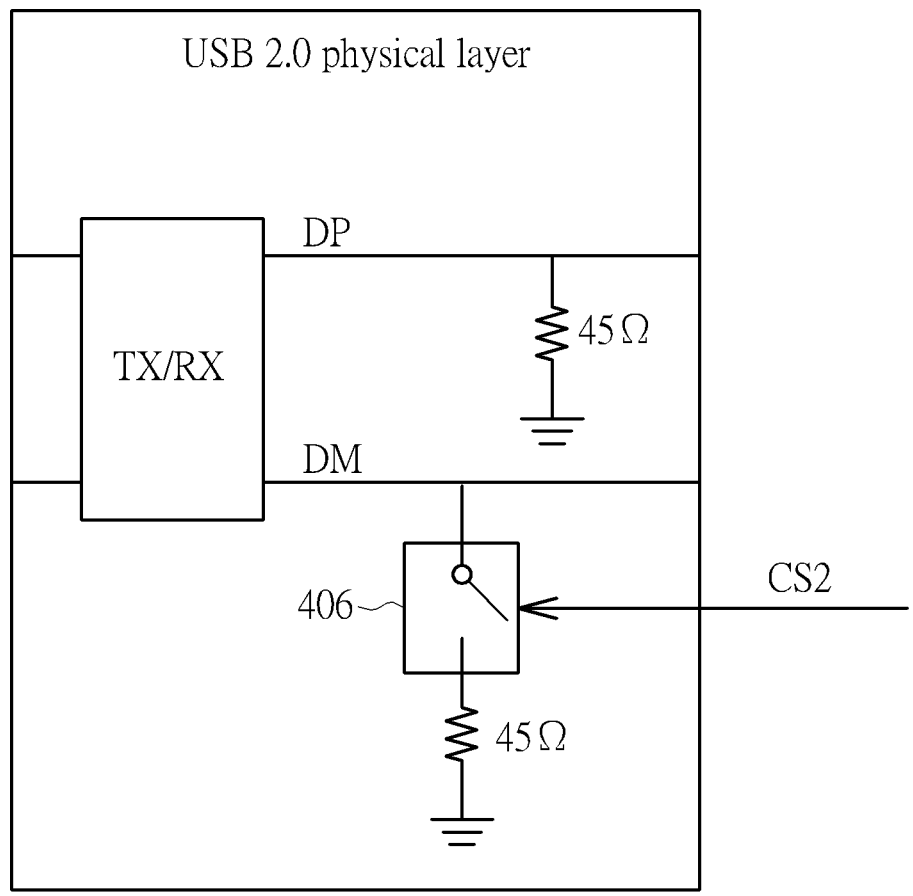
FIG. 4 is a diagram illustrating a switch configured in a USB 2.0 physical layer according to an embodiment of the present invention.

The hub control method and associated circuit are also applicable to a USB 2.0 hub. FIG. 4 is a diagram illustrating a switch configured in the USB 2.0 physical layer according to an embodiment of the present invention. The switch 406 is coupled between a differential signal (DM) and a 45 ohm recognition resistor. The other terminal of the 45 ohm recognition resistor is coupled to a ground voltage. The switch 406 may be controlled by the second control signal cs2 to connect or disconnect the 45 ohm recognition resistor accordingly. Note that the invention is not limited to the arrangement shown in FIG. 4.

The hub control method and associated circuit may be applied to a hub of other types different from the USB hub. Alternative designs include a bridge for converting between different port standards. For example, one of the uplink port and the plurality of downlink ports is a USB 3.0 port, a USB 2.0 port, a Serial Advanced Technology Attachment (SATA) port, Peripheral Component Interconnect Express (PCIe) port, an Ethernet port or a Secure Digital (SD) memory card slot. In one example, the uplink port is a USB 2.0 port and the downlink ports include a USB 2.0 port, an Ethernet port and an SD card slot.

Compared to the prior art, the disclosed hub can actively disconnect from the host terminal and enter a power saving mode without waiting for the host terminal and the system to send a command. The advantage is that the hub can always enter the power saving mode no matter whether the system supports the power saving mode or not. Further, after the hub enters the power saving mode, it is unnecessary to monitor commands sent from the host terminal. Thus the uplink port of the hub can be thoroughly powered off and the entire power consumption substantially alleviated.

In particular, it is envisaged that the aforementioned inventive concept can be applied by a semiconductor manufacturer to any integrated circuit. It is further envisaged that, for example, a semiconductor manufacturer may employ the inventive concept in the design of a stand-alone device, or application-specific integrated circuit (ASIC) and/or any other sub-system element.

Aspects of the invention may be implemented in any suitable form including hardware, software, firmware or any combination of these. The invention may be implemented, at least partly, as computer software running on one or more data processors and/or digital signal processors or configurable module components such as FPGA devices. Thus, the elements and components of an embodiment of the invention may be physically, functionally and logically implemented in any suitable way. The functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor or controller. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved hub control method and associated circuit have been described, wherein the aforementioned disadvantages with prior art arrangements have been substantially alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hub control method for controlling a hub comprising an uplink port and a plurality of downlink ports, the hub control method comprising:
    receiving respective link status of each downlink port and generating a first control signal accordingly, using the link status of said each downlink port to learn whether said each downlink port has established a first connection with a device;
    generating a second control signal according to the first control signal; and
    controlling a switch coupled to the uplink port having a resistor by the second control signal to make the uplink port unrecognizable to a host terminal when link statuses of the plurality of downlink ports indicate that none of the plurality of downlink ports has established the first connection; and
    controlling the switch coupled to the uplink port by the second control signal to make the uplink port recognizable to the host terminal when one of the link statuses of the plurality of downlink port indicates that the first connection has been established.

2. The hub control method of claim 1, wherein the step of controlling the switch coupled to the uplink port having the resistor by the second control signal to make the uplink port unrecognizable to the host terminal when link statuses of the plurality of downlink ports indicate that none of the plurality of downlink ports has established the first connection further comprises:
    powering off the uplink port when link statuses of the plurality of downlink ports indicate that none of the plurality of downlink ports has established the first connection.

3. The hub control method of claim 1, wherein one of the uplink port and the plurality of downlink ports is a Universal Serial Bus 3.0 (USB 3.0) port or a USB 2.0 port.

4. The hub control method of claim 1, wherein one of the uplink port and the plurality of downlink ports is a Serial Advanced Technology Attachment (SATA) port.

5. The hub control method of claim 1, wherein one of the uplink port and the plurality of downlink ports is a Peripheral Component Interconnect Express (PCIe) port.

6. The hub control method of claim 1, wherein one of the uplink port and the plurality of downlink ports is an Ethernet port.

7. The hub control method of claim 1, wherein one of the uplink port and the plurality of downlink ports is a Secure Digital (SD) memory card slot.

8. The hub control method of claim 1, wherein the step of controlling the switch coupled to the uplink port having the resistor by the second control to make the uplink port unrecognizable to the host terminal comprises:
    controlling the switch to disconnect the resistor of the uplink port from a receiving path, so that the uplink port is unrecognizable to the host terminal.

9. The hub control method of claim 1, wherein the uplink port supports a hot-plug function.

10. The hub control method of claim 1, wherein the uplink port is a USB 3.0 port, and the resistor is a 50 ohm resistor.

11. The hub control method of claim 1, wherein the uplink port is a USB 2.0 port, and the resistor is a 45 ohm resistor.

12. The hub control method of claim 1, wherein the step of controlling the switch coupled to the uplink port by the second control signal to make the uplink port recognizable to the host terminal comprises:
    controlling the switch to connect the resistor to the receiving path when one of the link statuses of the plurality of downlink port indicates that the first connection has been established, so that the uplink port is recognizable to the host terminal.

13. A hub control circuit for controlling a hub comprising an uplink port and a plurality of downlink ports, the hub control circuit comprising:
    a switch, coupled to the uplink port having a resistor;
    a link status receiving unit, arranged to receive respective link status of each downlink port that is used to learn whether said each downlink port has established a first connection with a device and generate a first control signal accordingly; and
    an uplink port control unit, arranged to generate a second control signal according to the first control signal, wherein when link statuses of the plurality of downlink ports indicate that none of the plurality of downlink ports has established the first connection, the second control signal generated from the uplink port control unit controls the switch to make the uplink port unrecognizable to a host terminal;
    wherein when one of the link statuses of the plurality of downlink port indicates that the first connection has been established, the second control signal generated from the uplink port control unit controls the switch to make the uplink port recognizable to the host terminal.

14. The hub control circuit of claim 13, wherein the uplink port control unit further powers off the uplink port when link statuses of the plurality of downlink ports indicate that none of the plurality of downlink ports has established the first connection.

15. The hub control circuit of claim 13, wherein one of the uplink port and the plurality of downlink ports is a Universal Serial Bus 3.0 (USB 3.0) port, a USB 2.0 port, a Serial Advanced Technology Attachment (SATA) port, a Peripheral Component Interconnect Express (PCIe) port, an Ethernet port or a Secure Digital (SD) memory card slot.

16. The hub control circuit of claim 13,
    wherein the switch is coupled to the resistor of the uplink port, and when the link statuses of the plurality of downlink ports indicate that none of the plurality of downlink ports has established the first connection, the second control signal generated from the uplink port control unit controls the switch to disconnect the resistor from a receiving path, so as to make the uplink port unrecognizable to the host terminal.

17. The hub control circuit of claim 13, wherein the uplink port supports a hot-plug function.

18. The hub control circuit of claim 13, wherein the uplink port is a USB 3.0 port, and the resistor is a 50 ohm resistor.

19. The hub control circuit of claim 13, wherein the uplink port is a USB 2.0 port, and the recognition resistor is a 45 ohm resistor.

20. The hub control circuit of claim 13, wherein when one of the link statuses of the plurality of downlink port indicates that the first connection has been established, the second control signal generated from the uplink port control unit controls the switch to connect the resistor to the receiving path, so as to make the uplink port recognizable to the host terminal.

* * * * *